United States Patent [19]

Leveque et al.

[11] 4,404,174
[45] Sep. 13, 1983

[54] PURIFICATION OF SOLUTIONS OF GALLIUM VALUES BY SERIAL ION EXCHANGE-LIQUID/LIQUID EXTRACTION

[75] Inventors: Alain Leveque, Paris; Michel Triollier, Gouvieux, both of France

[73] Assignee: Rhone-Poulenc Industries, Paris, France

[21] Appl. No.: 326,166

[22] Filed: Nov. 30, 1981

[30] Foreign Application Priority Data

Dec. 5, 1980 [FR] France ................. 80 25832

[51] Int. Cl.³ .................................. C01G 15/00
[52] U.S. Cl. ........................ 423/112; 75/101 BE
[58] Field of Search ............... 423/112; 75/101 BE

[56] References Cited

U.S. PATENT DOCUMENTS 3,151,931 10/1964 Small .
3,971,845 7/1976 Helgorsky et al. ................. 423/112
4,193,968 3/1980 Sullivan et al. ................. 75/101 BE
4,241,029 12/1980 Helgorsky et al. ................. 423/112

FOREIGN PATENT DOCUMENTS 1297623 5/1962 France .
2438096 4/1980 France .

OTHER PUBLICATIONS

Sakharova et al., "Chemical Absts.", vol. 84, 1976, #63054a.
Kudryavakii et al., "Chemical Absts.", vol. 81, 1974, #41823m.
Bagreeu et al., "Journal of Inorganic & Nuclear Chem.," vol. 40, 1978, pp. 553–557.
Aoyagi, "Chemical Absts.," vol. 55, 1961, #21974(f) and (h).
Voinarovskaya et al., "Chemical Absts.," vol. 87, 1977, #170934w.
Ivanova et al., "Chemical Absts.," vol. 80, 1974, #87881m.

*Primary Examiner*—Herbert T. Carter
*Attorney, Agent, or Firm*—Burns, Doane, Swecker & Mathis

[57] ABSTRACT

Highly pure (>99.99%) aqueous solutions of gallium chloride are obtained by a process having two major stages. The first stage, effected by passage of an aqueous acid solution containing gallium over a strongly basic ion exchange resin, makes it possible to eliminate an appreciable quantity of metal ions, such as Ca, Mg, Cr, V, Co, Zn and Pb, and further serves to concentrate the initial solution. In the second stage, the remaining ions, such as Al, Na and particularly $Fe^{+++}$ are eliminated by a two-phase extraction with an organic extractant, preferably a $C_4$ to $C_{10}$ alcohol or a quaternary ammonium chloride.

23 Claims, 2 Drawing Figures

PURIFICATION OF SOLUTIONS OF GALLIUM VALUES BY SERIAL ION EXCHANGE-LIQUID/LIQUID EXTRACTION

CROSS-REFERENCE TO RELATED APPLICATIONS

Leveque et al. copending applications, Ser. No. 326,177 and Ser. No. 326,178, both filed concurrently herewith, both assigned to the assignee hereof, and both hereby expressly incorporated by reference. Cf. Helgorsky et al. U.S. Pat. Nos. 3,971,843; 4,169,130 and 4,241,029.

BACKGROUND OF THE INVENTION

1. Field of the Invention

The present invention relates to the purification of solutions of gallium, and, more especially, to such purification as to obtain a solution of gallium chloride very high in purity.

The invention more particularly relates to a process for the purification of aqueous acid solutions of gallium, which process enabling obtainment of solutions of gallium having a degree of purity in excess of 99.99%.

2. Description of the Prior Art

The various applications of gallium in the field of electronics make it necessary to obtain the gallium in a very high degree of purity. It thus proves necessary to have available processes which enable, starting from solutions of gallium which do not meet the desired purity specifications, obtainment of solutions of gallium having a degree of purity in excess of 99.99%, from which solutions it will be possible to very readily obtain gallium oxide or gallium metal in the degrees of purity necessary for their various applications.

And indeed various processes have heretofore been proposed for separating gallium from other impurities, the most effective of which featuring the use of ion exchange resins.

However, the separation of gallium from certain metal ions, such as those of calcium, magnesium, aluminum, cobalt, vanadium, copper, manganese, sodium, zinc and, in particular, iron in the ferric state, proves inadequate when employing selective exchange of the gallium from the solution to be purified by means of an anion exchange resin [*Chemical Abstracts*, 55, 21974 IV (1961)]. To solve the problem of purification in the presence of iron in the ferric state, it too has been proposed [*Chemical Abstracts*, 55, 21974 V (1961), and 74, 108688 k (1971)] to reduce the iron to ferrous iron before percolating contact with the resin. Nonetheless, such a process is characterized by the fundamental disadvantage of not affording sufficient purification of the solution of gallium.

SUMMARY OF THE INVENTION

Accordingly, a major object of the present invention is the provision of an improved process for the purification of impure solutions of gallium, which process enables the markedly enhanced purification of such solutions in the presence of the aforenoted various elements, and in particular of iron.

Briefly, the subject process essentially comprises the combination of a step for fixing or exchanging the gallium in solution onto an ion exchange resin, which effects a first purification, followed by a concentration of the gallium in the solution resulting from elution of the resin, and a step for purifying the resulting solution by liquid/liquid extraction utilizing a solvent which selectively extracts the gallium values.

DETAILED DESCRIPTION OF THE INVENTION

Figure 1:
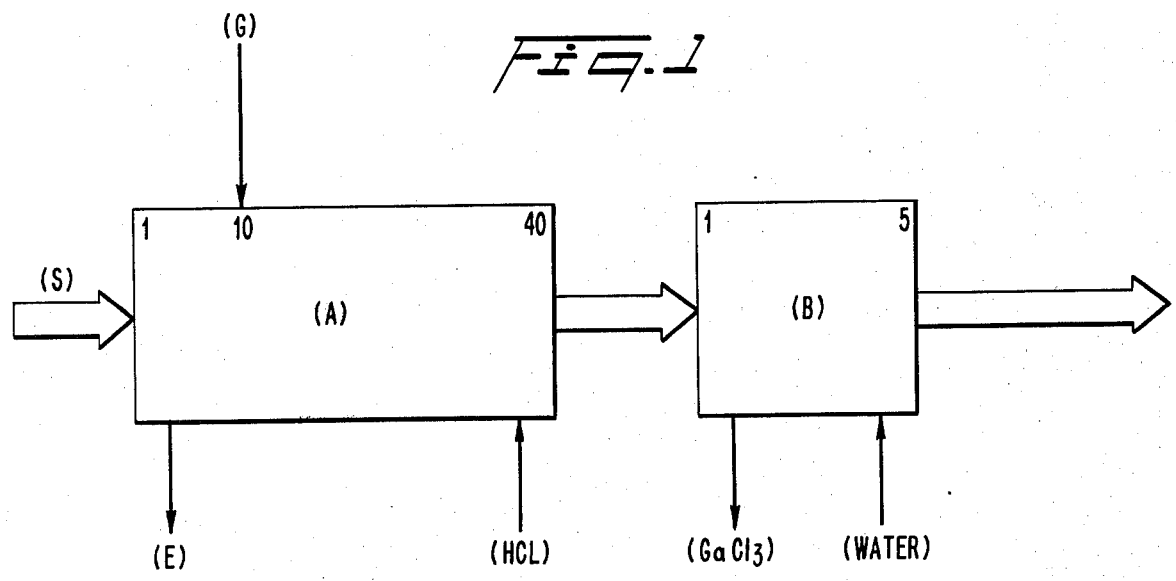
FIG. 1 is a schematic/diagrammatic illustration of one extraction apparatus suitable for carrying out the process according to this invention.

More particularly according to this invention, there is featured a process for the purification of an aqueous acid solution of gallium for the purpose of obtaining a solution of gallium chloride very high in purity, said process comprising:

(i) if necessary, adjusting the concentration of the chloride ions in the starting aqueous acid solution of gallium to a value ranging from about 3.5 to 8 M;

(ii) intimately contacting said solution of gallium values with a strongly basic ion exchange resin to affix the gallium thereto; and, optionally after washing the resin with a hydrochloric acid solution having a concentration which is at least as great as about 5 M, eluting the gallium from the resin with water to obtain a concentrated aqueous solution of gallium chloride;

(iii) adjusting the concentration of the chloride ions in the resulting solution to a value ranging from about 4 to 6 M;

(iv) next liquid/liquid extracting said concentrated aqueous solution of gallium chloride with an organic phase which comprises an extractant for the gallium and which is insoluble in water, such that the gallium is extracted/transferred into the organic phase; and then separating the organic phase from the aqueous phase;

(v) selectively washing said organic phase to remove any remaining impurities; and (vi) thence transferring the purified gallium from said organic phase into an aqueous solution thereof and, finally, separating the organic phase from the resulting aqueous phase, whereby said aqueous phase comprises pure gallium chloride.

The aqueous acid solutions of gallium which can be purified consistent with the process of this invention, for the purpose of obtaining solutions very high in purity, can emanate from very diverse origins. Same are preferably solutions of at least one acid selected from the group comprising, e.g., hydrochloric, sulfuric and perchloric acids.

The nature and amount of the impurities contained in these solutions can be very varied, and the impurities can consist of various metal ions from the Periodic Table of elements, notably those of calcium, magnesium, aluminum, vanadium, chromium, copper, manganese, sodium, zinc, cobalt, nickel, lead, cadmium, indium, barium, strontium, potassium, titanium, lanthanides, yttrium, arsenic, iron (particularly in the ferric state), phosphorus, tin, boron, and the like. Furthermore, the concentration of gallium in these solutions can also vary over wide limits; however, the process according to the present invention is particularly advantageous for purifying dilute solutions of gallium, the concentration of which is, for example, less than about 10 g/liter.

The process according to the present invention is particularly suitable for the purification of aqueous solutions produced by that process for the recovery of gallium from the solutions of sodium aluminate resulting from the Bayer process, such as described, in particular, in French Pat. Nos. 2,277,897; 2,307,047 and 2,307,882, French Patent Applications Nos. 76/29,009 and 77/21,607 and European Patent Application No. 78/4,002,222 assigned to the assignee hereof.

Also in accordance with the process of the invention, the concentration of chloride ions in the starting solution of gallium is adjusted, if indeed this proves necessary, to a value ranging from about 3.5 to 8 M and preferably to a value ranging from 4.5 to 6 M.

The immediately aforesaid concentration is preferably adjusted by adding hydrochloric acid to the solution of gallium. It is also possible to effect this adjustment by adding any chloride which will not be affixed to the resin in the subsequent step; suitable chlorides which are exemplary are, preferably, the alkali metal or alkaline earth metal chlorides.

After the concentration of chloride ions has been adjusted, if necessary, the solution of gallium is intimately contacted with a strongly basic ion exchange resin and which is gel-like or macrocrosslinked in nature, which very selectively affixes the gallium thereto, likely essentially completely in the form of the anionic complex, $GaCl_4^-$. Representative such resins are, in particular, those comprising recurring units of the formulae:

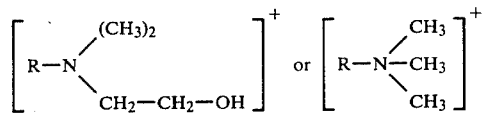

in which R represents, for example, a styrene/divinylbenzene or acrylic/divinylbenzene copolymer. Exemplary of such products are those marketed under the trademarks: Dowex 1, Duolite A 101 D, Duolite A 42, Lewatit M 500, Amberlite IRA 400, Amberlite IRA 410, Amberlite IRA 900, Amberlite IRA 910 and Permutit ESB (A).

Their capacity to affix the gallium typically ranges from about 80 to 120 g of gallium per liter of resin. When the fixing operation has been completed, the resin charged with gallium is washed, if appropriate, with a solution of hydrochloric acid, the concentration of which is preferably greater than or equal to 5 M, in order to remove the impurities retained with the gallium on the resin.

The gallium is then recovered by eluting the resin with water. This provides a concentrated and purified solution of gallium chloride, the concentration of which is typically about 40 to 60 g/liter of gallium and the free acidity of which is about 1 to 2 M.

Aside from the aforesaid very substantial purification, the gallium has now been considerably concentrated compared with the initial impure solution. This concentration is particularly favorable for the second step of purification by solvent extraction, both as regards its efficiency and as regards the reduction in the size of the extraction apparatus which it permits.

The step of concentration/purification onto the resin can be carried out in conventional apparatus and in particular by placing the resin in several columns arranged in series.

The concentration of chloride ions in said resulting solution is adjusted to a value ranging from about 4 to 6 M exactly as above described, preferably by adding hydrochloric acid to the said solution.

In accordance with the process of the invention, the concentrated aqueous solution of gallium is then intimately contacted with an organic phase containing a gallium extractant which is substantially insoluble in water and, optionally, an inert diluent, such that the gallium is selectively extracted into the organic phase.

The extractants which are advantageously employed consistent herewith include:

(1) the alcohols having the general formula ROH in which R is an aliphatic and/or cycloaliphatic hydrocarbon radical, preferably having from about 4 to 10 carbon atoms, and exemplary of such alcohols are pentanol, n-butanol, isobutanol, cyclohexanol, n-hexan-1-ol, 2-ethylhexanol, n-heptanol, n-octanol, isooctanol, n-decanol or isodecanol; pure 2-ethylhexanol is preferably used; and (2) the quaternary ammonium salts having the formula $R_3N-CH_3^+Cl^-$ in which the hydrocarbon radical R has from 8 to 10 carbon atoms. These products are marketed, in particular, under the trademarks Adogen 464 and Aliquat 336.

Also compare the aforenoted copending applications, Ser. No. 326,177 and Ser. No. 326,178.

The proportion or amount of the extractant comprising the organic phase is not critical and also can vary over wide limits. However, it is generally advantageous for this proportion to be as high as possible. Thus, in the case of the quaternary ammonium salts, an amount ranging from 3% to 30% by volume, relative to the overall organic phase, provides hydrodynamic conditions well suited for the subject purification. In the case of the alcohols, the least viscous can be used pure, namely, undiluted in the organic phase, and this is particularly advantageous because such provides very substantial extraction capacities; their amount typically varies from 10 to 100% by volume, again relative to the overall organic phase.

As is well known to those skilled in this art, the organic phase can also contain, in particular, a diluent. Among the diluents normally used in the field of liquid/liquid extraction, exemplary are aliphatic compounds such as, for example, heptane, dodecane, hexane and petroleum cuts of the kerosene type; aromatic compounds such as, for example, benzene, toluene, ethylbenzene, xylene and cuts of the Solvesso type (registered trademark of Exxon), and, finally, halogen derivatives of these compounds, such as, for example, chloroform or carbon tetrachloride.

The aqueous phase is next separated from the organic phase containing the gallium and a selective washing operation is then conducted upon such organic phase, which removes the remaining impurities which have been extracted in small or trace amounts with the gallium.

Depending upon the extractant employed, this selective washing of the organic phase is preferably carried out in the following manner:

(1) if the extraction agent is an alcohol, the organic phase is intimately contacted with water or an aqueous solution of hydrochloric acid, the concentration of which is advantageously less than about 6 M. The impurities are thus transferred into the wash solution, while the organic phase retains the purified gallium;

(2) if the extraction agent is a quaternary ammonium chloride, the organic phase is intimately contacted with an aqueous hydrochloric acid wash solution having an acidity of between 5 and 8 M and containing from 1 to 50 g/liter of gallium and preferably from 3 to 10 g/liter of gallium.

An exemplary wash solution is, for example, a mixture of, on the one hand, an aqueous hydrochloric acid solution advantageously at a concentration ranging from about 7 to 12 M, and, on the other, a fraction of the ultimately resulting purified aqueous solution of gallium chloride.

The aqueous washing solution which results, which contains the impurities and a small amount of gallium, can optionally be recycled with the initial aqueous acid solution of gallium in order to repeat the purification operations.

The purified gallium is then transferred from the organic phase into an aqueous solution by bringing the organic phase, which has been subjected to the washing operation described above, into contact with water.

Finally, the organic phase is separated from the aqueous phase. The resultant aqueous phase contains pure gallium in the form of gallium chloride having a purity in excess of 99.99%.

The steps of extraction, selective washing and recovery of the gallium can be carried out in conventional apparatus used for liquid/liquid extraction processes. Such apparatus typically comprises stages of mixer/decanter systems or of packed and/or agitated columns, arranged such as to carry out the operations of extraction, selective washing and recovery of the extracted element in the aqueous phase.

In order to further illustrate the present invention and the advantages thereof, the following specific examples are given, it being understood that same are intended only as illustrative and in nowise limitative.

EXAMPLE 1

126 liters of a sulfuric acid solution of gallium, produced by the process for the recovery of gallium from those solutions of sodium aluminate obtained via the Bayer process and in accordance with the process described in European Patent Application No. 78/4,002,222, assigned to the assignee hereof, were purified.

This solution had the following composition and contained the various noted impurities in the following concentrations:

| | |
|---|---|
| Ga: | 3.2 g/liter |
| H$_2$SO$_4$: | 4 M |
| Al: | 4.1 g/liter |
| Na: | 1.8 g/liter |
| Fe$^{3+}$: | 350 g/liter |
| Ca: | 60 mg/liter |
| Mg: | 30 mg/liter |
| Cr: | 7 mg/liter |
| V: | 280 mg/liter |
| Cu: | 80 mg/liter |
| Mn: | 3 mg/liter |
| Zn: | 4 mg/liter |
| Pb: | 2 mg/liter |

The concentration of chloride ions in this solution was adjusted to a value of 4.5 M by adding thereto 76 liters of 12 M hydrochloric acid.

Two columns, each containing 2.25 liters of quaternary ammonium resin sold by Dia-Prosim under the trademark Duolite A 101 D, were then continuously charged with the resulting solution at a flow rate of 1.2 liters/hour.

When the first column became saturated with gallium, namely, after the 202 liters of feed solution had percolated therethrough, same was isolated and was washed with 10 liters of a 6 M hydrochloric acid solution.

The gallium fixed to the resin was then eluted with 3.8 liters of water at a flow rate of 1 liter/hour, and this provided a solution of gallium chloride, GaCl$_3$, having the following composition:

| | |
|---|---|
| Ga: | 53 g/liter |
| HCl: | 1.1 M |
| Al: | 3 mg/liter |
| Na: | 25 mg/liter |
| Fe$^{3+}$: | 650 mg/liter |
| Ca: | 1.5 mg/liter |
| Mg: | 1 mg/liter |
| Cr: | 0.6 mg/liter |
| V: | 0.2 mg/liter |
| Cu: | 0.4 mg/liter |
| Mn: | 0.4 mg/liter |
| Zn: | 1.6 mg/liter |
| Pb: | 0.1 mg/liter |

A concentration and an appreciable first purification of the initial solution of gallium had thus been achieved. The most important remaining impurity was iron in the ferric state (Fe$^{3+}$).

The concentration of chloride ions in the solution thus obtained was adjusted to a value of 5.4 M by adding thereto 2.5 liters of 12 M hydrochloric acid.

This solution has then intimately contacted with an organic phase consisting of 2-ethylhexanol. This operation was carried out, as illustrated in FIG. 1 of the accompanying drawings, in a multi-stage liquid/liquid extraction apparatus (A) operating countercurrently and comprising 40 theoretical stages. The 2-ethylhexanol (S) was charged into the apparatus at stage 1 at a flow rate of 510 ml/hour. The solution of gallium (G) was introduced into the apparatus at stage 10 at a flow rate of 300 ml/hour.

The selective washing was carried out by introducing a 2 M hydrochloric acid solution (HCl) at stage 40 at a flow rate of 90 ml/hour.

The exhausted aqueous phase (E) exiting stage 1 contained all of the impurities and less than 100 mg/liter of gallium, which corresponded to a degree of extraction of more than 99.5%.

The 2-ethylhexanol (S) charged with gallium, exiting the apparatus A, was charged into a 5-stage apparatus B in which the gallium was recovered in aqueous solution by bringing (S) into contact with water, countercurrently, at a flow rate of 320 ml/hour. This provided a solution of gallium chloride (GaCl$_3$) having the following composition:

| | | |
|---|---|---|
| Ga | | 30 g/liter |
| Al | < | 0.2 mg/liter |
| Na | < | 0.05 mg/liter |
| Fe | < | 0.1 mg/liter |
| Ca | < | 0.05 mg/liter |
| Mg | < | 0.05 mg/liter |
| Cr | < | 0.1 mg/liter |
| V | < | 0.05 mg/liter |
| Cu | < | 0.1 mg/liter |
| Mn | < | 0.05 mg/liter |
| Zn | < | 0.05 mg/liter |

| | | |
|---|---|---|
| -continued | | |
| Pb | < | 0.05 mg/liter |

The gallium in the solution obtained thus had a purity in excess of 99.99%.

EXAMPLE 2

The solution of gallium obtained in accordance with Example 1, after contacting with the resin in the column, was used. Its composition was:

| | |
|---|---|
| Ga: | 53 g/liter |
| HCl: | 1.1 M |
| Al: | 3 mg/liter |
| Na: | 25 mg/liter |
| $Fe^{3+}$: | 650 mg/liter |
| Ca: | 1.5 mg/liter |
| Mg: | 1 mg/liter |
| Cr: | 0.6 mg/liter |
| V: | 0.2 mg/liter |
| Cu: | 0.4 mg/liter |
| Mn: | 0.4 mg/liter |
| Zn: | 1.6 mg/liter |
| Pb: | 0.1 mg/liter |

Figure 2:
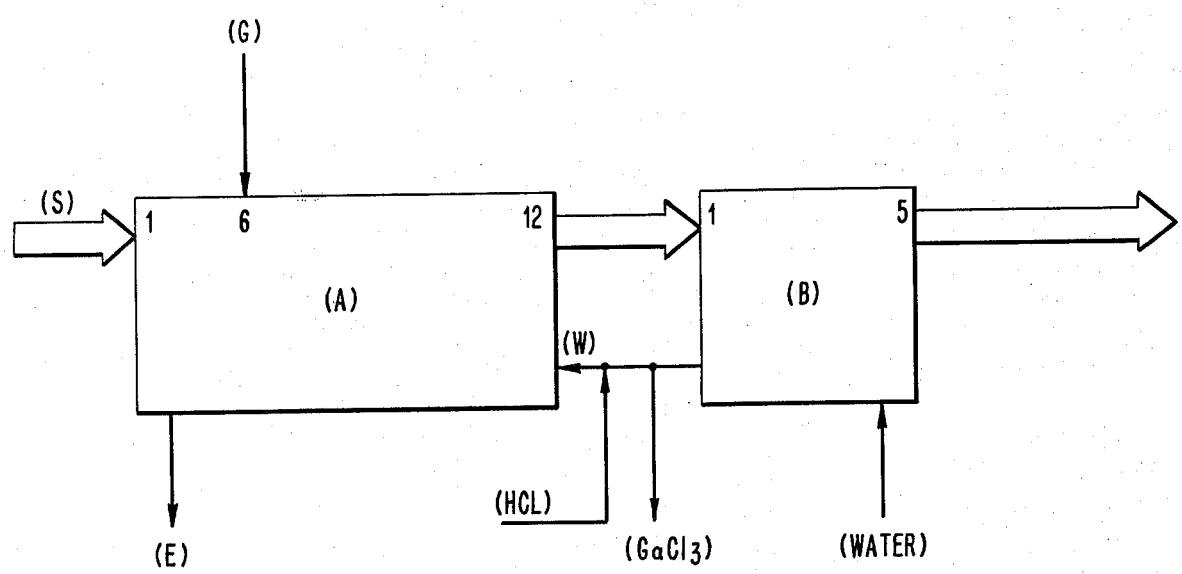
FIG. 2 is a schematic/diagrammatic illustration of another extraction apparatus also suitable for carrying out the process according to the invention.

The apparatus utilized was that illustrated in FIG. 2 of the accompanying drawings.

The concentration of chloride ions was adjusted to 6 M by adding 3 liters of 12 M HCl, and this provided a solution of gallium chloride (G). Such solution was then intimately contacted with an organic phase (S) consisting of a 6% strength solution of tricaprylylmethylammonium chloride (sold under the trademark Aliquat 336 in the chloride form) in Solvesso 150 (registered trademark of Exxon).

Such operation was carried out, as illustrated in FIG. 2, in a multi-stage liquid/liquid extraction apparatus (A) operating countercurrently and comprising 12 theoretical stages. The organic phase (S) was charged into the apparatus at stage 1 at a flow rate of 2,540 ml/hour. The solution of gallium (G) was introduced into the apparatus at stage 6 at a flow rate of 300 ml/hour. The selective washing of the charged organic phase was carried out in stage 6 to 12 by means of the wash solution (W) described below.

The organic phase exiting A, which contained the purified gallium, was then charged into stage 1 of the apparatus B comprising 5 theoretical stages, in which apparatus the gallium was re-extracted, by water entering at stage 5 at a flow rate of 1,270 ml/hour, in the form of a solution of gallium chloride containing 14 g/liter of Ga.

635 ml/hour of this solution were removed and same constituted the final production, while 635 ml/hour were combined with 635 ml/hour of 12 M HCl to form the wash solution W which was then charged into the apparatus A at stage 12.

The exhausted solution E contained all the impurities and less than 50 mg/liter of Ga, namely, more than 99% of the gallium had been extracted.

The solution of purified gallium had the following composition:

| | | |
|---|---|---|
| Ga: | | 14 g/liter |
| Al | < | 0.2 mg/liter |
| Na | < | 0.05 mg/liter |
| Fe | < | 0.1 mg/liter |
| Ca | < | 0.05 mg/liter |

| | | |
|---|---|---|
| -continued | | |
| Mg | < | 0.05 mg/liter |
| Cr | < | 0.1 mg/liter |
| V | < | 0.05 mg/liter |
| Cu | < | 0.1 mg/liter |
| Mn | < | 0.05 mg/liter |
| Zn | < | 0.05 mg/liter |
| Pb | < | 0.05 mg/liter | which corresponded, for the gallium, to a purity in excess of 99.99%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the purification of an aqueous acid solution of gallium values, comprising:
   (i) intimately contacting an impure aqueous acid solution of gallium values with a strongly basic ion exchange resin capable of selectively affixing gallium thereto, whereby said gallium values are affixed to said resin, the concentration of chloride ions in said starting aqueous acid solution ranging from about 3.5 to 8 M, and thereafter eluting the gallium from the resin with water to afford a partially purified concentrated solution of gallium chloride;
   (ii) adjusting the concentration of the chloride ions in the resulting concentrated aqueous solution to a value ranging from about 4 to 6 M;
   (iii) liquid/liquid extracting the adjusted aqueous solution of gallium chloride with an organic phase which comprises an essentially water-insoluble extractant capable of extracting gallium from the aqueous solution, whereby the gallium is transferred into the organic phase, and then separating the organic phase from the aqueous phase;
   (iv) selectively washing said organic phase, whereby any remaining impurities are removed;
   (v) next transferring the purified gallium from said organic phase into an aqueous solution thereof, and then separating said organic phase from the resulting aqueous phase, whereby said aqueous phase comprises pure gallium chloride.

2. The process as defined by claim 1, the concentration of chloride ions in the starting aqueous acid solution ranging from about 4.5 to 6 M.

3. The process as defined by claim 1, the starting aqueous acid solution comprising a hydrochloric acid solution.

4. The process as defined by claim 1, the starting aqueous acid solution comprising a sulfuric acid solution.

5. The process as defined by claim 1, the starting aqueous acid solution comprising a perchloric acid solution.

6. The process as defined by claim 1, the starting aqueous acid solution derived from a Bayer process solution.

7. The process as defined by claim 1, the concentration of chloride ions in the starting aqueous acid solution having been adjusted by addition of hydrochloric acid or a non-ion exchangeable chloride thereto.

8. The process as defined by claim 1, said ion exchange resin being gel-like and macrocrosslinked.

9. The process as defined by claim 8, said ion exchange resin comprising recurring units of the structural formulae:

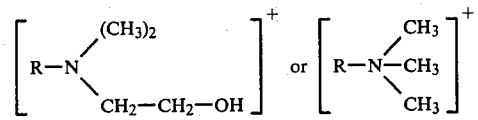

wherein R is a styrene/divinylbenzene or acrylic/divinylbenzene copolymer.

10. The process as defined by claim 1, the eluted concentrated aqueous solution of gallium chloride having a concentration of gallium ranging from about 40 to 60 g/liter, and a free acidity of from about 1 to 2 M.

11. The process as defined by claim 1, the starting aqueous acid solution having a concentration of gallium of less than about 10 g/liter.

12. The process as defined by claim 1, the starting aqueous acid solution of gallium values comprising at least one of the metal cations of calcium, magnesium, aluminum, vanadium, chromium, copper, manganese, sodium, zinc, cobalt, nickel, lead, cadmium, indium, barium, strontium, potassium, titanium, lanthanides, yttrium, arsenic, iron, phosphorus, tin and boron.

13. The process as defined by claim 12, the starting solution comprising ferric iron.

14. The process as defined by claim 1, the gallium extractant being an alcohol of the formula ROH, wherein R is an aliphatic or cycloaliphatic hydrocarbon having from 4 to 10 carbon atoms.

15. The process as defined by claim 14, the alcohol extractant being selected from the group consisting of pentanol, n-butanol, isobutanol, cyclohexanol, n-hexanol, 2-ethylhexanol, n-heptanol, n-octanol, isooctanol, n-decanol and isodecanol.

16. The process as defined by claim 1, the gallium extractant being a quaternary ammonium chloride.

17. The process as defined by claim 16, the quaternary ammonium chloride extractant having the formula:

$$R_3NCH_3^+Cl^-$$

wherein each R is a hydrocarbon having from 8 to 10 carbon atoms.

18. The process as defined by claim 1, 14 or 16, the organic phase of extraction comprising a diluent selected from the group consisting of heptane, dodecane, hexane, petroleum cut of kerosene type, benzene, toluene, ethylbenzene, xylene, cut of Solvesso type, chloroform and carbon tetrachloride.

19. The process as defined by claim 1, said organic phase being (iv) selectively washed with water or with a less than 6 M solution of hydrochloric acid.

20. The process as defined by claim 19, said organic phase being (iv) selectively washed with an about 5 M to about 8 M acid solution containing from about 1 to about 50 g/liter of gallium.

21. The process as defined by claim 20, the acid wash solution containing from 3 to 10 g/liter of gallium.

22. The process as defined by claim 1, said organic phase being (iv) selectively washed with a mixture of (1) an about 7 M to about 12 M solution of hydrochloric acid, and (2) a fraction of the ultimately resulting aqueous phase which comprises the pure gallium chloride.

23. The process as defined by claim 1, wherein, in step (i), the resin is washed with an at least 5 M hydrochloric acid solution prior to elution of the gallium from the resin with water.

* * * * *